(No Model.)
J. A. CAMERON.
ANTIFRICTION JOURNAL BEARING.
No. 501,868. Patented July 18, 1893.
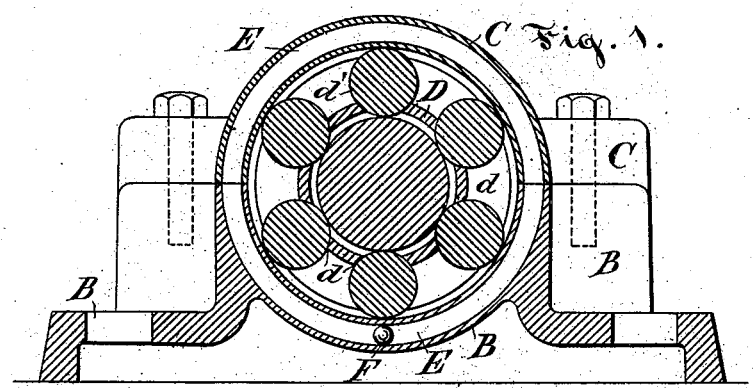
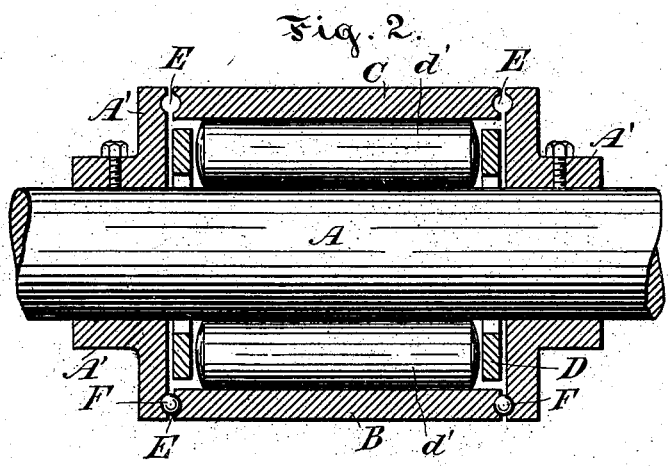
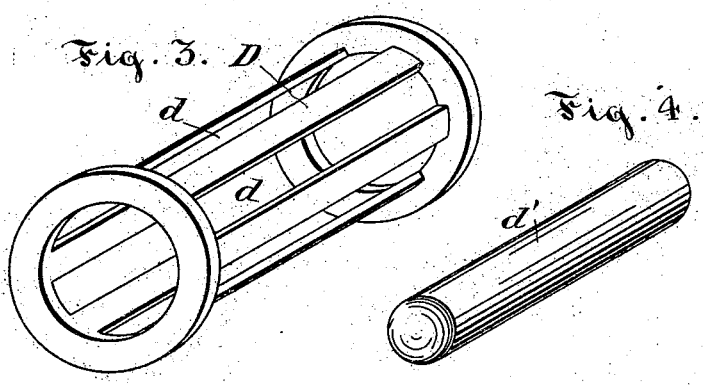
Witnesses:
Chas. Raley
W. Noffke
John A Cameron
Inventor
by A. Harvey
Attorney

UNITED STATES PATENT OFFICE.

JOHN A. CAMERON, OF CORNWALL, CANADA.

ANTIFRICTION JOURNAL-BEARING.

SPECIFICATION forming part of Letters Patent No. 501,868, dated July 18, 1893.

Application filed March 22, 1892. Serial No. 426,028. (No model.) Patented in Canada November 21, 1885, No. 22,859.

*To all whom it may concern:*

Be it known that I, JOHN A. CAMERON, a citizen of Canada, residing at the town of Cornwall, in the county of Stormont and Province of Ontario, Canada, have invented new and useful Improvements in Antifriction-Boxes, (for which I have obtained a patent in Canada, No. 22,859, dated November 21, 1885,) of which the following is a specification.

My invention relates to journal boxes for car axles and other vehicles, line shafting and shafting in machinery.

The object of my invention is to construct a journal box in which all sliding contact is obviated and converted into rolling contact, whereby friction is reduced. I accomplish this object by placing on the journal a sleeve having a number of longitudinal slots each carrying an anti-friction roller, the diameter of which is in excess of the thickness of the sleeve, so as to be in contact with the journal and with its bearing and by forming at the edges of the bearing, an annular recess in which a ball or sphere is placed, bearing against the collar or shoulder upon the shaft or axle, similarly recessed, to prevent the face of the collar or shoulder from touching the edge of the bearing.

Figure 1 is a cross section of my improved anti friction journal box. Fig. 2 is a longitudinal section of the same. Fig. 3 is a perspective view of the journal sleeve, and Fig. 4 is a perspective view of one of the anti friction rollers.

A is the shaft or axle.

A' are the collars at each end of the journal to form the neck and prevent longitudinal motion of the same.

B, is the journal box proper and C the cover bolted or screwed down in the usual manner.

D is the sleeve or shell fitted loose upon the journal and loose within the base of the box and cover. This sleeve is provided with a number of longitudinal slots $d$ each receiving one of the anti friction rollers $d'$, the diameter of which is in excess of the thickness of the sleeve D, so as to project within and without the latter and be in contact with the journal box and the neck of the shaft or axle, the diameter of the bore of the box being proportioned to receive said sleeve with its rollers $d'$.

E are annular recesses formed in the ends of the journal box and cover, the length of the sleeve D being made equal to the length of the neck or bearing between the two annular recesses so as not to project over or into the recesses. Each collar A' is similarly recessed and set a little in excess of the full length of the box or bearing.

In each recess E a sphere or ball F, is inserted to work freely between each collar A' and the box and cover. It is obvious that if the longitudinal thrust of a shaft or an axle is in one direction only, only that end of the box at which the pressure is located need be provided with the recess E, but a ball F, may nevertheless be used as a rolling bearing between the collars and each end of the sleeve D. The sleeve D is preferably made very thin and provided with rims or flanges at the ends, which rims or flanges must obviously be less than the diameter of the anti friction rollers $d'$. It will be observed that the sleeve D forms the bearing for the anti friction rollers $d'$ which bear against the edge of the slot $d$, and that the sleeve D, roller $d'$, and balls F may be replaced when worn out. The sleeve D may also when desired be made in halves and the journal may be formed by dispensing with the collars A' and forming shoulders on the shaft or axle A by turning down the neck instead.

I claim as my invention—

The combination of a cylindrical slotted sleeve, rollers in said slots, a casing comprising a shell recessed at each end and recessed collars at opposite ends, said recesses forming an annular groove, and a ball in each groove.

JOHN A. CAMERON.

Witnesses:
D. A. CAMERON,
A. D. CAMERON.